Nov. 23, 1965  G. HEITMANN ETAL  3,219,436
METHOD FOR REDUCING IRON OXIDES INTO SPONGE IRON
Filed June 24, 1963
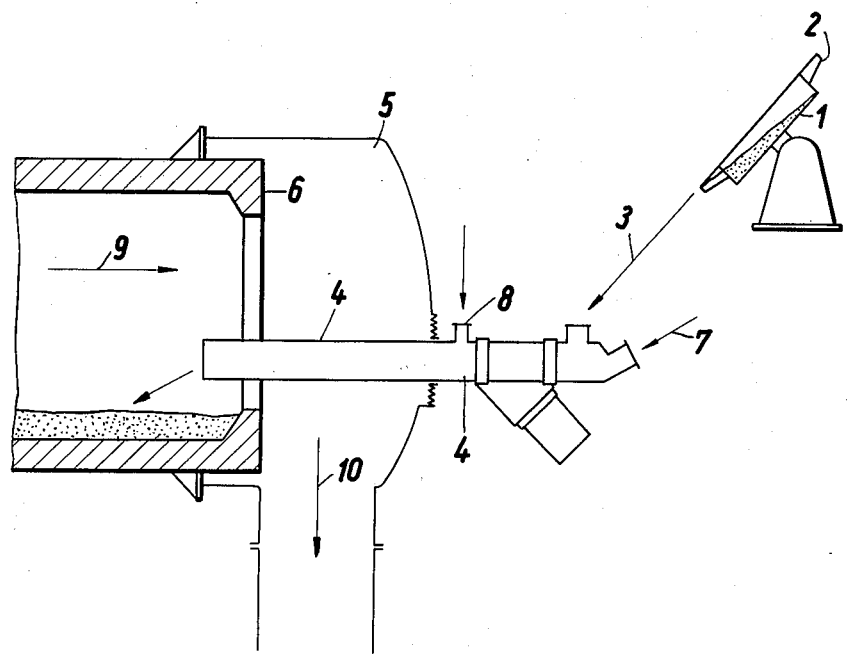
Inventors
GÜNTER HEITMANN
KURT MEYER
By Bailey, Stephens & Huettig
Attorneys

3,219,436
METHOD FOR REDUCING IRON OXIDES INTO SPONGE IRON

Günter Heitmann and Kurt Meyer, Frankfurt am Main, Germany, assignors to Metallgesellschaft Aktiengesellschaft, Frankfurt am Main, Germany
Filed June 24, 1963, Ser. No. 289,954
Claims priority, application Germany, June 30, 1962, M 53,402
8 Claims. (Cl. 75—34)

This invention relates to a method and apparatus for reducing all kinds of iron oxides, preferably concentrates, to sponge iron. The iron oxides are first agglomerated as by being pelletized or briquetted and then heated with solid reduction material in a rotary furnace. Burner nozzles are positioned substantially along the longitudinal axis of the furnace for providing a substantial portion of the required reduction heat.

The object of this invention is to overcome three problems. The first object is to eliminate the need for heat hardening the agglomerated iron oxides, which heretofore was considered to be absolutely necessary, before introducing the iron oxides into the furnace for reduction therein. Secondly, it is an object to increase the range of pellet or briquette size to decrease the number of over or undersized pellets or briquettes which would have to be recycled through the pellet or briquette forming apparatus. For example, it has been customary to limit the range of pellets which are to be reduced in this type of rotary furnace to diameters held within the limits of 6 to 15 mm. as disclosed in Canadian Patent No. 617,334 and U.S. Patent No. 3,029,141. The third object is to produce a green pellet of iron oxides which is especially of light weight and highly reducible, and which, if necessary, can be made into briquettes in a further step of the process of this invention. The agglomerates made and reduced according to this invention are stable and have a microporosity so that they are especially suitable for use in blast furnaces, cupola furnaces, Siemens-Martin furnaces, electric arc furnaces, induction furnaces, and oxygen converters.

This invention essentially improves upon the state of the art as reported by Kurt Meyer on the making of plastic and moist green pellets in the magazine "Steel and Iron," 1956, pages 588 to 595, and 1962, pages 147 to 154. According to this prior art, three methods exist for heat hardening green pellets, to wit: roasting in a cupola, kiln or blast furnace, roasting on a travelling grate or sinter band, and roasting in a rotary kiln, with either gas or oil being used for fuel. Note the above 1962 publication, page 148.

According to this invention, the heretofore used heat hardening of green pellets or other agglomerates is eliminated. In this invention, the freshly formed moist and plastic green pellets are introduced immediately into a rotary furnace heated to the reduction temperature and are thus immediately heated in the so-called preheating zone of the furnace. It has been found, surprisingly enough, that, when these moist plastic green pellets are introduced directly into a rotary furnace having burner nozzles distributed along the entire length of the furnace, the green pellets are not destroyed by the mechanical and thermal stresses including the sudden evaporation of water during the heating of the pellets as would be expected. Accordingly, it is a further feature of this invention that the water content of the green pellets can be as much as the pellets can hold and still retain their pellet form. Depending upon the type of iron oxides being used, the water content can be increased up to 12% water when using highly concentrated iron oxides. With or without this increase in water content, the moist green pellets can be given a coating or dusting of solid fuel either before or while they are being introduced into the rotary furnace.

This immediate introduction or feeding of the moist agglomerates, as, for example, green pellets, which have not been pre-dried or preheated, into the rotary reduction furnace now creates a new type of pellet and contrary to the prior art heat hardened pellet, possesses a much higher micro-porosity after being reduced and thus has a lower apparent specific weight or density which amounts to about 1.3 g./cm.$^3$. This new pellet nevertheless has a much higher stability and a substantially higher degree of reduction with regard to a clear increase in capacity of about 30% and when given a uniform pellet size for the material being reduced. At the same time, the temperature of the waste gas discharged from the furnace is lessened because of the great evaporation of water from the pellets where they are introduced into the rotary furnace. In this invention, the temperature of the waste gases is about 550° C. as compared to a temperature of 700° C. obtained by the feeding of the prior art pre-roasted pellets. German application No. 1,058,080, published May 27, 1959, and now abandoned, discloses the pelletizing and drying of moist iron oxides in a drum and then increasing the stability of the pellets by introducing them into a rotary furnace in which they are gradually heated to a temperature of approximately 1070° C., note column 4, lines 22 to 26. In so doing, in a four-hour passage through the furnace, a hard pellet of sponge iron was obtained which had shrunk so that its original density of 2.5 g./cm.$^3$ had been raised to about 3.2 g./cm.$^3$. This shrinking and increase in density does not occur according to this invention because of the manner in which the green pellets are heated, the limiting feature being that the green pellets are heated at a temperature which is less than that necessary for the heat hardening or roasting of pellets outside of the furnace.

Also, the prior art methods of roasting pellets outside of the reduction furnace caused a crystalline growth which made an increase in the coarseness of the pellets and/or caused adhesion by reason of slag or dross. These two undesirable characteristics do not occur according to the method of this invention in which the reduction proceeds at a greater speed with the simultaneous obtaining of a higher micro-porosity of the pellet.

It has also been found in this invention that the rapid reduction of the iron oxides to metallic iron forms an elastic and very porous metal jacket on each pellet, which jacket, as opposed to prior art pre-hardened pellets, does not prevent the continuous entrance of the reduction gases, but on the contrary, enhances such since it gives each pellet an astonishing stability with the retention of its original porosity even after the water has been evaporated, and which pellet has a density of about 1.3 g./cm.$^3$.

The green pellets of this invention, after having been reduced, can then be pressed together to form a briquette having a dense smooth surface and a correspondingly lower inclination to oxidizing than is possible with the pre-roasted and then reduced prior art pellets. Furthermore, the reduced pellets of this invention have the advantage of being able to be crushed to iron dust since the metallic structure with the microporosity facilitates the crushing.

As compared to the narrow range for the usable pellet sizes of the prior art, the green pellets available for this invention can have a much larger range of sizes extending, for example, for about 3 to 25 millimeters in diameter and larger. All of these pellets in a moist or, if desired, excessive water content can be fed into the rotary reduction furnace. This furnace preferably has burner nozzles extending along the entire length of the furnace and directed against the flow of the waste gases through the furnace.

According to a feature of the invention, the moist green pellets are coated with a layer of reduction material such as coal or coke before the pellets are introduced into the reduction furnace. By so doing, and with the incorporation of solid fuel within the pellets approximately from 10 to 20% of the fuel necessary for the reduction of the pellets can be carried by the pellets. Both can be performed quite easily directly in front of the entrance to the furnace, for example, by using a conventional rotary pelletizing disc having a dusting edge, or by using a conventional rotary pelletizing drum or vibrator conveyor in advance of the pellet feeding mechanism. The rotary drum includes a firmly attached screw conveyor and is rotated faster than the rotary furnace. When using feeding devices of this type, it is important that the moist plastic green pellets having a high water content are handled carefully which is done by embedding the green pellets in an excess of solid fuel simultaneously introduced into the furnace for the reduction of the pellets.

Moklebust, U.S. Patent No. 2,829,042, discloses a rotary furnace in which the burner nozzles are located substantially on the longitudinal axis of the furnace and pointed in the same direction as the flow of the waste gases through the furnace and counter to the flow of the material being reduced in the furnace. However, in this invention, the burner nozzles are preferably pointed in an opposite direction, that is the nozzles are directed against the flow of the waste gases through the furnace. Moreover, in this invention, the burner nozzles are not supplied with a preheated mixture of air and gas, but are operated in the same manner as welding torches in that each burner nozzle is composed of two concentric pipes wherein the outer pipe serves for an adjustable supply of air under pressure and the inner pipe serves for an adjustable supply of fuel gas. This enables the adjustment of the atmosphere of the furnace over broad limits. Finally, it is possible in this invention to direct the outlet nozzle orifices of the burners either radially or inclined to said axis within the preheating zone of the furnace in order to evaporate the water from the green pellets as rapidly as possible.

The apparatus by which the method of the invention is performed is disclosed more fully with reference to the accompanying drawing.

In this apparatus, the green pellets are introduced directly into the preheating zone of a rotary furnace. The iron oxides are formed into pellets on the pelletizing disc 1 having a so-called powder edge 2 for coating the newly formed pellets with solid fuel as they are discharged from the disc. The green pellets fall down a chute indicated by the arrow 3 into the feeding mechanism 4 such as a vibrating conveyor and which extends through an elastic joint in an air-tight hood 5 covering the end of the rotary furnace 6. The excess of solid reducing fuel of conventional particle size is introduced through the end 7 of mechanism 4 so that the green pellets, either with or without a coating of coal dust, fall into this bed of excess fuel and are then carried into the rotary furnace. Desulphurizing material, such as calcium and dolomite, is introduced through the opening 8 immediately in front of the hood 5. Hot waste gases as indicated by the arrows 9 and 10 flow around the feeding mechanism 4 composed either of a screw conveyor or a vibrating conveyor and in which the pellets begin to dry as they are being fed into the furnace.

This invention is further described with reference to the following example:

In this example, natural or synthetic magnetite was pelletized instead of hematite, because it has been found that magnetite, which is difficult to reduce, becomes surprisingly highly reduced when made into a moist green pellet and fed directly into the preheating zone of the rotary furnace.

An iron ore concentrate, composed of Fe 69 to 69.5%, sulphur 0.15 to 0.2%, occurring as natural magnetite was pelletized with the addition of water on the disc 1 to form pellets having diameters ranging from 8 to 25 mm. Bentonite amounting to 0.5% was added as a binder. The pellets so formed had a moisture content of 7% and these green moist pellets with a coating of coke fines from the coating edge 2 were fed into the rotary furnace 6 with dolomite added through opening 8 for the neutralization of the sulphur. This furnace is substantially similar to that shown in Patent No. 2,829,402 with the direction of the burner nozzles reversed. The furnace 6 was 9 meters long and had a diameter of 0.5 meter. Six burner nozzles were used spaced substantially equally along the longitudinal axis of the furnace. City gas was used for firing the burners. The green pellets were fed into the furnace with the following wet weights per hour:

| | | |
|---|---|---|
| 66 kg. green pellets | mm | 10 to 25 |
| 40 kg. coke fines | mm | 0 to 10 |
| 3 kg. dolomite | mm | 1 to 3 |

The pellets in the furnace were reduced at a temperature of 1100° C. in from 4 to 5 hours and then discharged into a cooling drum where they cooled to ambient temperature in about 1 hour. The sponge iron produced was dry separated from the excess of coal and dolomite by sifting or magnetic separation. These reduced pellets had the following analysis:

| | | |
|---|---|---|
| Total Fe | percent | 97.0 |
| Metallic Fe | do | 95.0 |
| S | do | 0.3 |
| C | do | 0.05 |

The iron oxide ore was thus reduced to 98% metallic iron which corresponds to a reduction degree of 99%. The portion of the fine particles in the sponge iron produced, that is the portion below a size of 8 mm., amounted to 35% and thus fell into the same size order as the portion of fines which occurred during the reduction of pre-roasted pellets of the same magnetite. Since in this invention the green pellets were introduced into the furnace in the same manner as pre-roasted pellets, this portion of fines can be traced to the mechanical stresses on the green pellets before reduction, while with the pre-roasted pellets, this portion of fines must be explained by their being destroyed during reduction. The surface of the reduced pellets of this invention was completely smooth and each pellet itself was very porous. The porosity volume was about 83%, independent of the size of the pellet. The density of each pellet was therefor uniformly very low and amounted to about 1.3 g./cm.$^3$. On the other hand, the true specific weight was 7.4 g./cm.$^3$ which was also independent of the pellet size corresponding to the high degree of reduction of 99%. The pellets, despite their low volume weight, were firmer than magnetite pellets of the same size which had been pre-roasted before being reduced. Thus the reduced pellets of this invention having diameters of from 15 to 20 mm. had a compression strength of 56 kg. per pellet while the corresponding crushing strength of pre-roasted pellets was 41 kg. per pellet. The reduced pellets of this invention having diameters of more than 20 mm. had a crushing strength up to about 100 kg. per pellet.

The reduced sponge iron pellets of this invention were very easily formed into briquettes. Such briquettes had a volume weight of 4.5 g./cm.$^3$ at a pressure of 2.5 metric tons per cm.$^2$. As compared to briquettes formed of pre-roasted pellets, the surface of the briquettes of this invention was completely smooth and the boundary lines between the individual pellets in the briquette could not be seen.

The excellent characteristics of the pellets of this invention in the forming of briquettes are paralleled by the ease with which the reduced pellets can be puverized. They are first crushed in a hammer mill to a size of about 2 mm. and then quickly pulverized in a rod mill to a size below 0.04 mm.

Having now described the means by which the objects of the invention are obtained,

We claim:

1. A method for reducing pellets composed of iron oxides to sponge iron comprising directly introducing moist, plastic green pellets along with an excess of solid reducing material into the pre-heating zone of a rotary furnace having a plurality of burner nozzles positioned substantially along the longitudinal axis of said furnace for the control of the gas atmosphere in said furnace and providing a substantial portion of the heat of reaction, and rapidly heating said pellets in said zone to their reduction temperature of about 1100° C.

2. A method as in claim 1, wherein said green pellets contain the maximum amount of moisture permitting retention of their pellet form.

3. A method as in claim 2, further comprising immersing said green pellets in said excess of solid reducing material while said pellets are being introduced into said furnace.

4. A method as in claim 3, further comprising incorporating solid fuel in said green pellets.

5. A method as in claim 4, further comprising making said green pellets with diameters ranging from about 3 to 25 mm.

6. A method as in claim 5, said pellets being composed of magnetite.

7. A method as in claim 6, further comprising cooling the pellets reduced in said furnace, and forming the cooled pellets into briquettes.

8. A method as in claim 6, further comprising pulverizing the pellets reduced in said furnace to form powdered metal.

References Cited by the Examiner

UNITED STATES PATENTS

| 2,797,077 | 6/1957 | Muller | 263—32 |
| 2,805,141 | 9/1957 | Apuli | 75—3 |
| 2,869,850 | 1/1959 | Wienert | 75—3 |
| 2,925,336 | 2/1960 | Stowasser | 75—3 |
| 2,941,791 | 6/1960 | Wienert | 75—36 |
| 3,029,141 | 4/1962 | Sibakin | 75—34 |
| 3,036,822 | 5/1962 | Andersen | 263—32 |
| 3,046,106 | 7/1962 | Hemminger | 75—36 |
| 3,068,091 | 12/1962 | Kirkland | 75—36 |

DAVID L. RECK, *Primary Examiner.*

WINSTON A. DOUGLAS, *Examiner.*